United States Patent [19]

Marquis

[11] 4,059,897

[45] Nov. 29, 1977

[54] METHOD OF JOINING THIN AND THICK SWITCH MEMBERS

[75] Inventor: Edgar E. Marquis, Newtown, Conn.

[73] Assignee: Robertshaw Controls Company, Richmond, Va.

[21] Appl. No.: 734,756

[22] Filed: Oct. 22, 1976

Related U.S. Application Data

[62] Division of Ser. No. 613,634, Sept. 15, 1975, abandoned.

[51] Int. Cl.$^2$ .............................................. B23P 11/00

[52] U.S. Cl. .................................... 29/432.1; 29/521; 29/522 R; 29/622; 113/116 FF

[58] Field of Search ................. 29/522, 521, 509, 432, 29/432.1, 432.2, 622; 52/758 D; 113/116 FF

[56] References Cited

U.S. PATENT DOCUMENTS

| | | | |
|---|---|---|---|
| 2,254,558 | 9/1941 | Williams | 29/521 X |
| 2,288,308 | 6/1942 | Williams | 29/521 |
| 2,619,855 | 12/1952 | Williams | 29/432 |
| 2,688,890 | 9/1954 | Williams | 29/505 X |
| 3,599,318 | 8/1971 | Behlen | 29/521 X |
| 3,900,937 | 8/1975 | Schleicher | 29/432X |
| 3,924,378 | 12/1975 | Hafner | 29/521 X |
| 3,981,064 | 9/1976 | Hafner | 29/432 |

*Primary Examiner*—Victor A. DiPalma
*Attorney, Agent, or Firm*—Candor, Candor & Tassone

[57] ABSTRACT

A joint construction of two members each having one surface thereof disposed against a surface of the other member. One of the members has a part thereof punched through an unblanked part of the other member beyond the other surface of the other member, the part of the one member being subsequently staked to the other surface of the other member to secure the members together.

7 Claims, 8 Drawing Figures

METHOD OF JOINING THIN AND THICK SWITCH MEMBERS

This application is a divisional patent application of its copending parent application Ser. No. 613,634 filed Sept. 15, 1976, now abandoned in favor of its continuation patent application, Ser. No. 734,757 filed Oct. 22, 1976.

This invention relates to an improved joint construction as well as to a method and apparatus for making such a joint construction or the like.

It is well known that when it is desired to secure together a pair of members without utilizing auxiliary fastening means, such as spot welding, rivets, etc., one member can have a part thereof passed through an opening in the other member and be subsequently staked over the other member to secure the same together.

It is a feature of this invention to provide an improved staking operation to secure two members together.

In particular, one embodiment of this invention provides a joint construction of two members formed by the method and apparatus of this invention wherein one surface of one member is disposed against one surface of the other member. A part of the one member is punched through an unblanked part of the one surface of the other member so that the part of the one member extends beyond the opposed surface of the other member. Thereafter, the projecting part of the one member is staked over the opposed surface of the other member to secure the members together whereby the punching of the part of the one member into the unblanked surface of the other member forms an opening through that other member to permit the subsequent staking operation to take place.

Accordingly, it is an object of this invention to provide an improved joint construction having one or more of the novel features set forth above or hereinafter shown or described.

Another object of this invention is to provide a method of making such a joint construction or the like, the method of this invention having one or more of the novel features set forth above or hereinafter shown or described.

Another object of this invention is to provide an improved apparatus for making such an apparatus or the like, the apparatus of this invention having one or more of the novel features set forth above or hereinafter shown or described.

Other objects, uses and advantages of this invention are apparent from a reading of this description which proceeds with reference to the accompanying drawings forming a part thereof and wherein.

Figure 2:
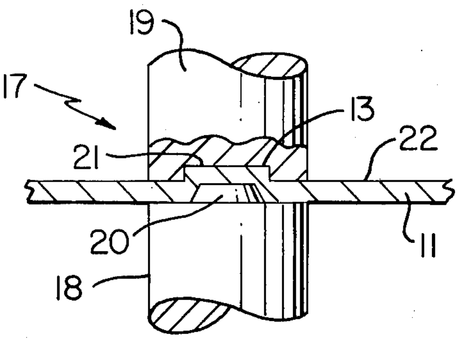
FIG. 2 PRIOR ART
FIG. 2 is a schematic cross-sectional view illustrating the prior art method of making part of the joint construction of FIG. 1.

While the various features of this invention are hereinafter described and illustrated as being particularly adapted to secure an electrical terminal to an electrical switch blade, it is to be understood that the various features of this invention can be utilized singly or in any combination thereof to provide means for joining other types of members together.

Therefore, this invention is not to be limited to only the embodiment illustrated in the drawings, because the drawings are merely utilized to illustrate one of the wide variety of uses of this invention.

Figure 1:
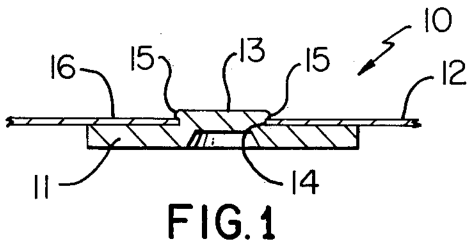
FIG. 1 PRIOR ART
FIG. 1 is a cross-sectional view of a prior art joint construction.

Referring now to FIG. 1, a prior art joint construction is generally indicated by the reference numeral 10 and comprises a metallic terminal 11 secured to a metallic switch blade 12 by a portion or part 13 of the terminal 11 being received through an opening 14 in the switchblade 12 and being subsequently staked over at the edges 15 thereof against the upper side 16 of the switchblade 12 to secure the same together.

The projecting part 13 of the terminal 11 is normally formed in a punching apparatus generally indicated by the reference numeral 17 in FIG. 2 wherein a lower punch member 18 cooperates with an upper die member 19 to form the projecting part 13 between an embossment 20 of the punch member 18 and cooperating cavity 21 of the die member 19 in a manner well known in the art. However, it has been found that the projection 13 of the terminal 11 of the prior art joint construction 10 when made by the apparatus 17 of FIG. 2 can only project above the upper surface 22 of the terminal plate 11 up to about 75% of the material thickness of the terminal plate 11 whereas the projecting part of the joint construction of this invention can be higher than the material thickness of the terminal plate as will be apparent hereinafter.

The joint construction of this invention is generally indicated by the reference numeral 25 in FIG. 3 and comprises a terminal plate 26 and a switchblade 27 secured together by a part 38 of the terminal plate 26 projecting through the blade 27 and being staked over at side edges 29 thereof in a manner hereinafter described whereby the terminal plate 26 and switchblade 27 are secured together.

Figure 3:
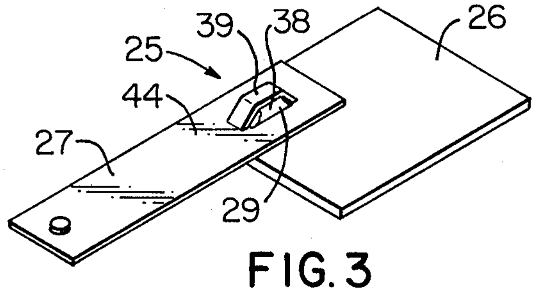
FIG. 3 is a fragmentary, perspective view illustrating the improved joint construction of this invention.
Figure 4:
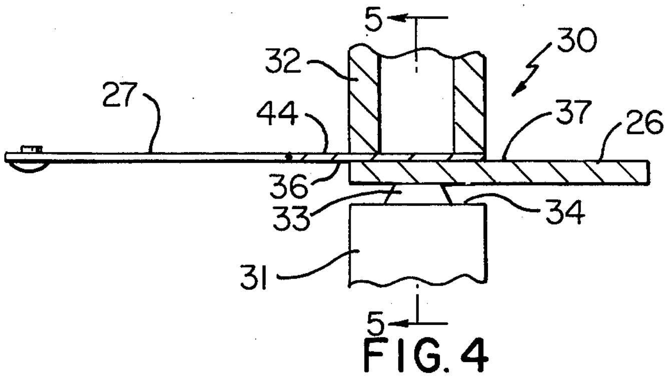
FIG. 4 is a schematic side view illustrating one step in the method and apparatus of this invention for making the joint construction of FIG. 3.
Figure 5:
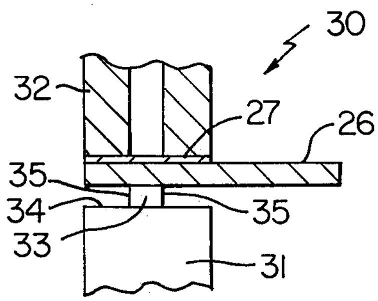
FIG. 5 is a fragmentary, cross-sectional view taken on line 5—5 of FIG. 4.

The apparatus and method of this invention for forming the joint construction 25 of FIG. 3 is generally indicated by the reference numeral 30 in FIG. 4 and comprises a punch 31 and a cooperating die member 32 with the punch 31 having an embossment 33 extending from the surface 34 thereof and being so constructed and arranged that the same is substantially a truncated triangular configuration when viewed from the side of FIG. 4 while having opposed straight sides 35 when viewed from either end thereof as illustrated in FIG. 5.

Figure 8:
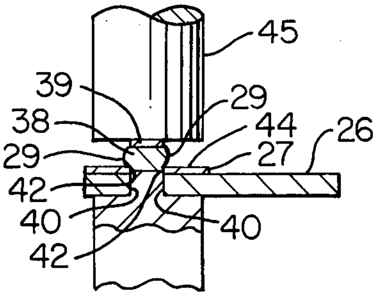
FIG. 8 is a view similar to FIG. 5 and illustrates the final step in the method and apparatus of this invention for forming the joint construction of FIG. 3.
Figure 6:
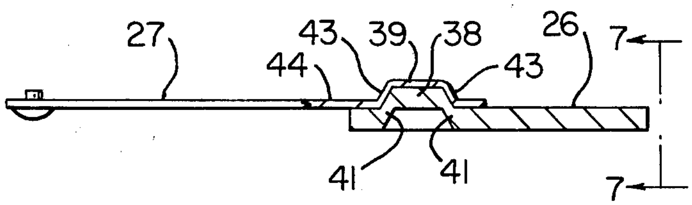
FIG. 6 is a cross-sectional view taken through the partially formed joint construction of this invention as formed by the step illustrated in FIGS. 4 and 5.
Figure 7:
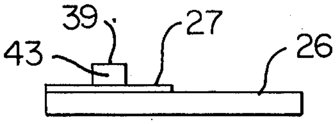
FIG. 7 is an end view of the arrangement illustrated in FIG. 6 and is taken substantially in the direction of arrows 7—7 of FIG. 6.

The switchblade 27 and terminal plate 26 are disposed with their respective surfaces 36 and 37 disposed in abutting relation between the punch 31 and die 32 as illustrated in FIGS. 4 and 5 and the punch and die 31 and 32 are brought together whereby the embossment 33 of the punch 31 punches a part 38 of the terminal plate 26 through an unblanked part 39 of the switchblade 27 in such a manner that the part 38 of the terminal plate 26 is sheared from the remainder of the plate 26 along opposed side edges 40 as illustrated in FIG. 8 while being interconnected thereto by slanting ends 41 as illustrated in FIG. 6. The unblanked part 39 of the switchblade 27 is likewise formed in a configuration similar to part 38 of the terminal plate 26 by being sheared at opposed side edges 42 from the remainder of the switchblade 27 as illustrated in FIG. 8 and having angularly disposed ends 43 integral therewith whereby the parts 38 and 39 of the terminal plate 26 and switchblade 27 respectively have substantially truncated triangular configurations as illustrated in FIG. 6.

It can be seen that the part 38 of the terminal plate 26 extends above the upper surface 44 of the switchblade 27 in the manner illustrated in FIG. 8 whereby the die member 32 is removed and another ram member 45 of the apparatus 30 is moved downwardly against the upper part 39 of the switchblade 27 in the manner illustrated in FIG. 8 to cooperate with the punch 31 and thereby compress the parts 38 and 39 of the plate 26 and blade 27 therebetween and cause the opposed side edges 29 of the part 38 of the terminal plate 26 to be staked against the upper surface 44 of the switchblade 27 in the manner illustrated in FIGS. 3 and 8 to securely fasten the switchblade 27 and terminal plate 26 together and form the joint construction 25 illustrated in FIG. 3.

In this manner, it can be seen that the height of the part 38 of the terminal plate 26 of this invention can be higher than the material thickness of the terminal plate 26 because the same is joined only at the ends 41 thereof to the remainder of the terminal plate 26 and the parts 38 and 39 of the terminal plate 26 and switchblade 27 are being simultaneously formed so that no separate blanking or punching operation is required on the switchblade 27 as is required in the prior art joint construction 10 previously described.

Further, by forming the parts 38 and 39 of the terminal plate 26 and switchblade 27 in the substantially truncated triangular configuration illustrated, the subsequently staked parts prevent rotational movement of the switchblade 27 and terminal plate 26 relative to each other and the staking operation can take place with the same punching member 31 forming a punching operation and a staking operation as previously described.

Therefore, it can be seen that this invention not only provides an improved joint construction, but also this invention provides an improved method and apparatus for making such a joint construction or the like.

While the form and methods of this invention have now been illustrated and described as required by the Patent Statute, it is to be understood that other forms and method steps can be utilized and still fall within the scope of the appended claims.

What is claimed is:

1. A method of joining a relatively thin metal switch blade member to a relatively thick terminal member to form as assembly for an electrical switch comprising the steps of disposing one surface of said terminal member against one surface of one end of the switch blade member, punching a part of said terminal member through an unblanked part of said one surface of said one end of said switch blade member so that said part of said terminal member extends beyond the opposed surface of said switch blade member, and staking said part of said terminal member to said opposed surface of said switch blade member to secure said members together whereby the other end of said switch blade member is carried in cantilevered fashion by said terminal member to perform a contact switching function.

2. A method as set forth in claim 1 wherein said step of staking comprises the step of compressing said part of said terminal member between the opposed sides thereof.

3. A method as set forth in claim 1 wherein said punching step causes said unblanked part of said switch blade member to be blanked and pushed beyond said opposed surface of said switch blade member.

4. A method as set forth in claim 3 wherein said step of staking comprises the step of compressing said parts of said members between opposed sides thereof.

5. A method as set forth in claim 3 wherein said punching step causes said part of said terminal member to be sheared along opposed sides thereof from said terminal member while remaining interconnected to said terminal member at the opposed ends of said one member.

6. A method as set forth in claim 5 wherein said punching step causes said part of said terminal member to be substantially a truncated triangular configuration in cross-section.

7. A method as set forth in claim 6 wherein said punching step causes said part of said switch blade member to be formed similar in configuration to said part of said terminal member.

* * * * *